US009709020B2

(12) United States Patent
Zhao et al.

(10) Patent No.: US 9,709,020 B2
(45) Date of Patent: Jul. 18, 2017

(54) FLOATING-TYPE OCEAN CURRENT COMBINATION POWER GENERATION DEVICE

(76) Inventors: Gaoyuan Zhao, Chongqing (CN); Kejun Gao, Chongqing (CN)

(*) Notice: Subject to any disclaimer, the term of this patent is extended or adjusted under 35 U.S.C. 154(b) by 378 days.

(21) Appl. No.: 14/114,530

(22) PCT Filed: Apr. 27, 2012

(86) PCT No.: PCT/CN2012/074856
§ 371 (c)(1),
(2), (4) Date: Oct. 29, 2013

(87) PCT Pub. No.: WO2012/146197
PCT Pub. Date: Nov. 1, 2012

(65) Prior Publication Data
US 2014/0070542 A1  Mar. 13, 2014

(30) Foreign Application Priority Data

Apr. 29, 2011 (CN) .......................... 2011 1 0109222
Mar. 16, 2012 (CN) .......................... 2012 1 0080071

(51) Int. Cl.
*F03B 13/10* (2006.01)
*F03B 17/06* (2006.01)

(52) U.S. Cl.
CPC ............ *F03B 13/10* (2013.01); *F03B 17/065* (2013.01); *F05B 2220/706* (2013.01); *F05B 2240/917* (2013.01); *F05B 2240/93* (2013.01); *F05B 2260/4031* (2013.01); *Y02E 10/28* (2013.01); *Y02E 10/38* (2013.01)

(58) Field of Classification Search
CPC .......... F03B 13/10; F03B 17/065; F03B 3/14; F03B 3/145; F05B 2240/93; F05B 2240/917; F05B 2260/4031
USPC .......................................................... 60/398
See application file for complete search history.

(56) References Cited

U.S. PATENT DOCUMENTS 2,428,515 A * 10/1947 Courson ............... F03B 17/065
416/119
3,743,848 A *  7/1973 Strickland ............... F03D 3/067
290/44
3,922,012 A * 11/1975 Herz ...................... F03B 17/065
290/43

(Continued)

FOREIGN PATENT DOCUMENTS

CA      2372776 A1 *  8/2003 ............. F03D 3/005
CN   201297234 Y *  8/2009 ............... F03D 3/06

(Continued)

*Primary Examiner* — Thomas E Lazo
*Assistant Examiner* — Matthew Wiblin
(74) *Attorney, Agent, or Firm* — Gokalp Bayramoglu

(57) ABSTRACT

A floating-type ocean current combination power generation device comprises a water-surface floating platform, an impeller assembly located below the water-surface floating platform and driven by ocean current, and a power generation assembly located above the water-surface floating platform for receiving rotary mechanical energy from the impeller assembly and transforming it into electric energy. The floating-type ocean current combination power generation device can realize the recovery of deep-sea ocean current energy to the sea surface without pollution and energy consumption.

7 Claims, 4 Drawing Sheets

(56) References Cited

U.S. PATENT DOCUMENTS

| | | | | |
|---|---|---|---|---|
| 5,467,727 A * | 11/1995 | Godvin | ................... | B63B 21/00 |
| | | | | 114/230.27 |
| 7,462,950 B2 * | 12/2008 | Hu | ..................... | F03D 11/0008 |
| | | | | 290/44 |
| 7,942,624 B1 * | 5/2011 | Erb | ......................... | F03D 3/068 |
| | | | | 415/4.2 |
| 8,164,213 B2 * | 4/2012 | Mahaffy | ................. | F03D 3/005 |
| | | | | 290/44 |
| 2003/0235498 A1 * | 12/2003 | Boatner | ................. | F03D 3/067 |
| | | | | 416/119 |
| 2011/0084495 A1 * | 4/2011 | Wu | ......................... | F03D 3/005 |
| | | | | 290/55 |
| 2011/0311360 A1 * | 12/2011 | Nedreb | .................. | F03D 11/04 |
| | | | | 416/85 |
| 2012/0132781 A1 * | 5/2012 | Kolokotronis | ....... | H01Q 1/1235 |
| | | | | 248/535 |

FOREIGN PATENT DOCUMENTS

| | | | | |
|---|---|---|---|---|
| CN | 101539099 A * | 9/2009 | .............. | F03D 3/06 |
| CN | 101539099 A | 9/2009 | | |
| CN | 201588724 U | 9/2010 | | |
| CN | 102146868 A | 8/2011 | | |
| CN | 102226444 A | 10/2011 | | |
| FR | 2867523 A3 | 9/2005 | | |
| GB | 2356430 A | 5/2001 | | |
| JP | 2006183650 A * | 7/2006 | .............. | F03D 11/04 |
| NZ | CN 1183134 A * | 5/1998 | .......... | F03D 11/0008 |

* cited by examiner

FLOATING-TYPE OCEAN CURRENT COMBINATION POWER GENERATION DEVICE

FIELD OF THE INVENTION

The present invention relates to a power generation device, especially to a device for generating power utilizing ocean current.

BACKGROUND OF THE INVENTION

Atmospheric circulation current, ocean current and river current produced by radiation of the sun onto the earth carry tremendous kinetic energy and is clean energy without pollution. Because extracted petroleum and coal can't be regenerated in a short term, it is a trend in human life and science development for utilizing green energy in nature. Specially, ocean current energy has great value due to its broad distribution and tremendous energy. More specially, since electric power has a long transmission distance feature, it is a preferable mode for utilizing kinetic energy in nature.

Conventionally, generating power by ocean current hasn't been popular, and deep-sea ocean current energy hasn't been fully utilized.

Hence, a device for generating power by ocean current is required, which is capable of developing and utilizing ocean current energy on a large scale. The device is required for generating power stably which solves problems of transmitting deep-sea ocean current energy to sea surface, by which ocean current power generation could be a new energy resource and be developed on a large scale, thus having great market and social value.

SUMMARY OF THE INVENTION

With this in mind, an object of the present invention is to provide a floating-type ocean current combination power generation device for developing and utilizing ocean current energy on a large scale. The device could generate power stably, which solves problems of transmitting deep-sea ocean current energy to sea surface, by which ocean current power generation could be a new energy resource and be developed on a large scale, thus has great market and social value.

The floating-type ocean current combination power generation device of the present invention comprises a water-surface floating platform, an impeller assembly located below the water-surface floating platform and driven by ocean current, and a power generation assembly located above the water-surface floating surface for receiving rotary mechanical energy from the impeller assembly and transforming it into electric energy;

the impeller assembly comprises blade components and an impeller shaft; the impeller shaft revolves and extends upwardly out of the water-surface floating platform, which has a transmission cooperation with a power input of the power generation assembly; the impeller assembly is limited downwardly along the axis of the impeller shaft and is capable of floating on working regions of sea together with the water-surface floating platform.

Further, the impeller shaft is a cylindrical truss shaft, the blade components at least comprise blades arranged uniformly along the circumferential direction of the cylindrical truss shaft.

Further, the blades are disposed for capable of swinging in a sector shape around the vertical axis, and the blades are limited along the rotary direction of the cylindrical truss shaft and apply resistance upon ocean current.

Further, the blade components further comprise blade frames fixed uniformly around the circumferential direction of the cylindrical truss shaft, the blades are capable of swinging in a sector shape around the vertical axis and being hinge with the blade frames.

Further, overload discharging elastic elements are disposed on the blade frames, the overload discharging elastic elements apply pre-tightening force onto the blades for limiting the positions of the blades along the rotary direction of the cylindrical truss shaft, and applying resistance on ocean current via the pre-tighting force.

Further, the blade frames have a grid structure disposed vertically, each of the blade respectively corresponds to each grid of the grid structure; the cylindrical truss shaft comprises vertical poles distributed uniformly around the circumferential direction of the cylindrical truss shaft and supporting ribs I for fixedly interconnecting the vertical poles;

the blade frames are fixedly interconnected by supporting ribs II.

Further, the plane of the blade frame is along a tangential direction of the cylindrical truss shaft; the overload discharging elastic elements is spring strip, one end of which is fastened on the blade frame and applies elastic force upon the blades, the elastic force limits the position of blades in the rotary direction.

Further, a positioning component is disposed at a lower part of the cylindrical truss shaft; the positioning component comprises a positioning shaft fixedly connected with the cylindrical truss shaft, and a shaft sleeve coated out of the positioning shaft and revolvably cooperates with the positioning shaft; the shaft sleeve is used for being connected with an anchor wire for anchoring thereof.

Further, the cylindrical truss shaft is detachable and could be assembled in different length; the blade frame is connected detachably with the cylindrical truss shaft.

Further, the water-surface floating platform has a ship-shaped structure or a composite structure formed by a steel structure and low-density polymeric material which is embedded in the lower part of the steel structure; multiple power generators are disposed uniformly around a driving gear ring, each power generator has a driven gear engaged with the driving gear ring; a fixed abutment is disposed on the water-surface floating platform, an annular body is revolvably disposed on the fixed abutment and forms a revolute joint with the fixed abutment; the revolute joint has a structure of a thrust bearing, a rolling wheel declined outwardly from up to down or a plane-sliding bearing; the power generation assembly comprises transmission components and the power generators, the transmission components comprise an annular body coaxially and fixedly connected with the cylindrical truss shaft fixedly and a driving gear ring fastened at least along the circumferential direction onto the annular body; the power input of the power generator comprises driven gears for being engaged with the driving gear ring and inputting power into the power generators; the annular body is revolvably disposed on the upper surface of the water-surface floating platform; a part of the cylindrical truss shaft revolvably cooperating with the water-surface floating platform is disposed with a shaft sleeve, a sliding bearing is disposed for cooperation of the water-surface floating platform and the shaft sleeve.

The present invention has following beneficial effects: the floating-type ocean current combination power generation device of the present invention utilizes the water-surface floating platform, such that the impeller assembly is capable of floating on the sea and being driven by ocean current, thus achieving the object of recycling ocean current energy; the impeller assembly of the present invention is capable of going deep into the deep sea, when used, the water-surface floating platform thereabove and the bottom of the impeller shaft are connected by an anchor wire for preventing drift and keeping the whole device floated. The device of the present invention solves problems of transmitting deep-sea ocean current energy to sea surface, by which ocean current power generation could be a new energy resource and be developed on a large scale without pollution and energy consumption, thus has great market and social value.

BRIEF DESCRIPTION OF THE DRAWINGS

The invention will be further illustrated in view of figures and embodiments.

DETAILED DESCRIPTION

Figure 1:
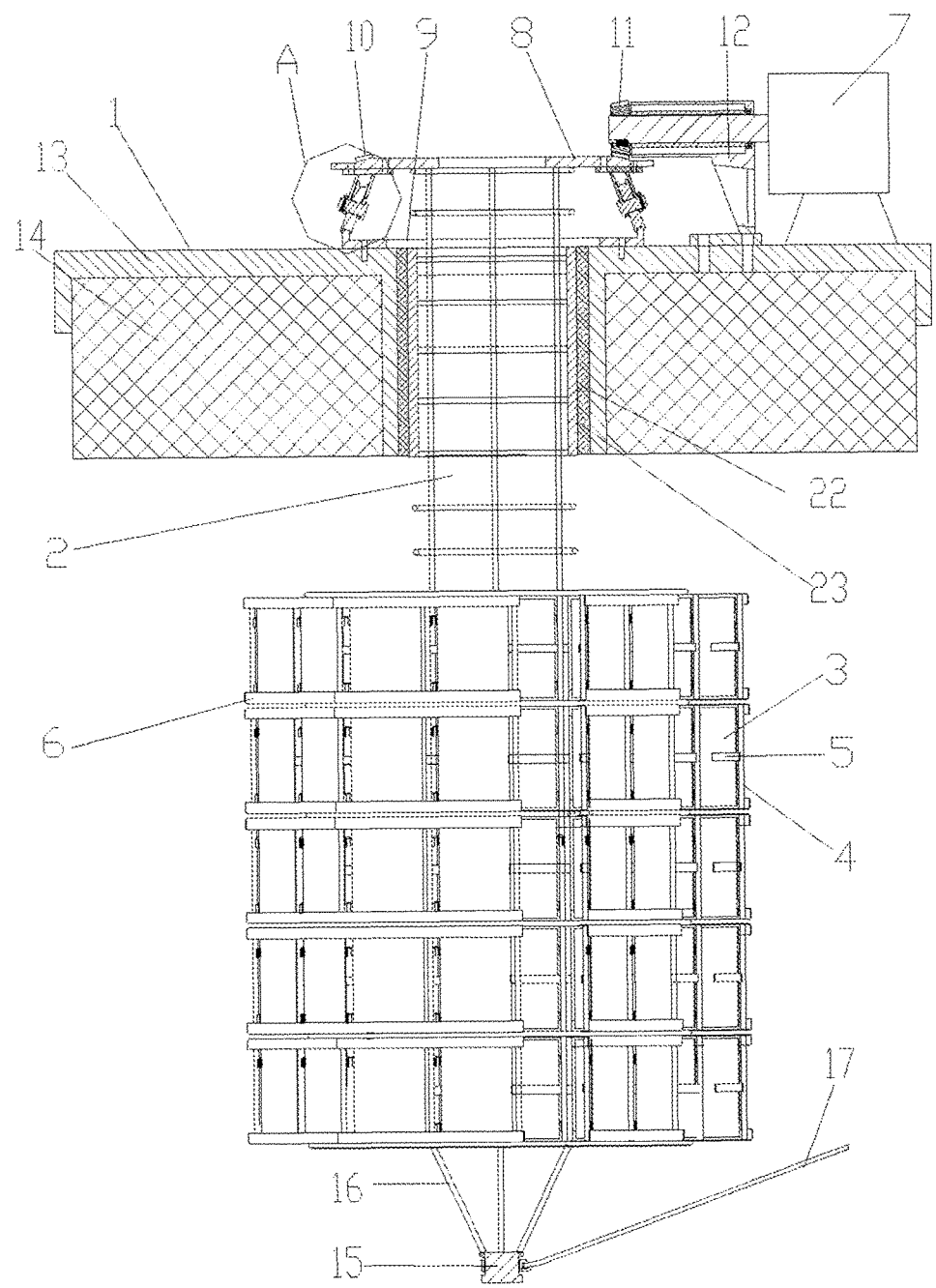
FIG. 1 is a sectional view of the invention.
Figure 2:
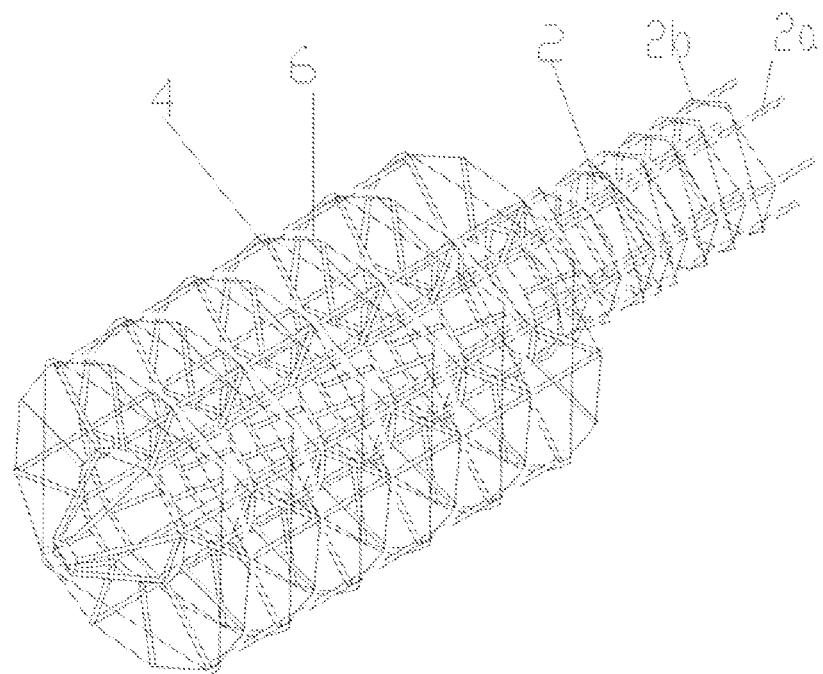
FIG. 2 is a schematic view of the impeller shaft of the invention.
Figure 3:
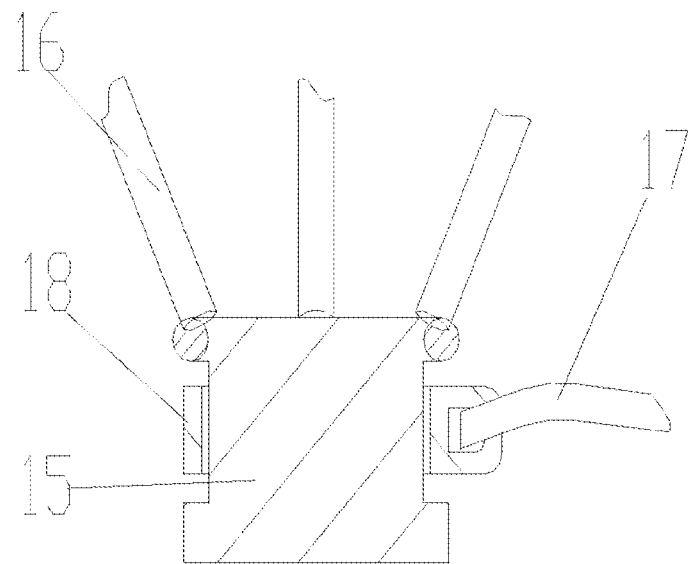
FIG. 3 is a schematic view of the positioning component.
Figure 4:
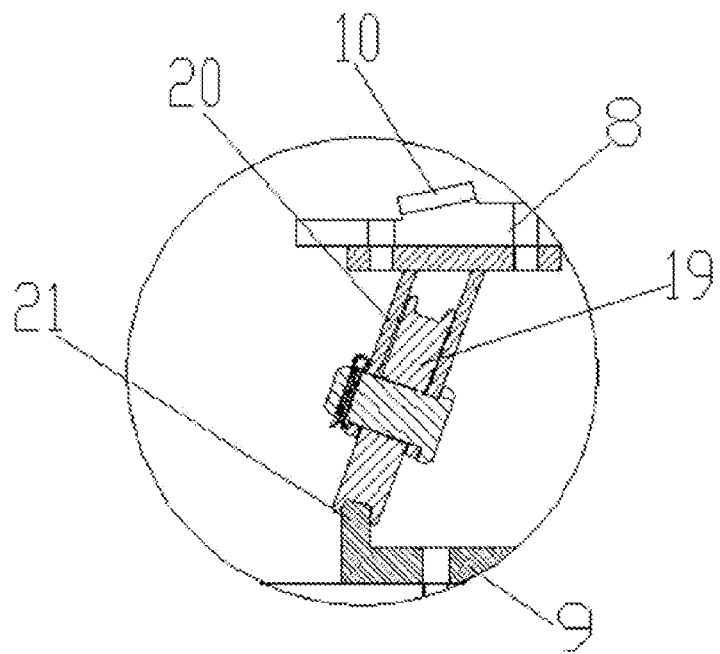
FIG. 4 is an enlarged view of A in FIG. 1.

FIG. 1 is a sectional view of the present invention. FIG. 2 is a schematic view of the impeller shaft of the present invention. FIG. 3 is a schematic view of the positioning components. FIG. 4 is an enlarged view of A in FIG. 1. As illustrated in figures, the floating-type ocean current combination power generation device of the present embodiment comprises a water-surface floating platform 1, an impeller assembly located below the water-surface floating platform, and a power generation assembly located above the water-surface floating platform for receiving rotary mechanical energy from the impeller assembly and transforming it into electric energy.

The impeller assembly comprises blade components and an impeller shaft 2. The impeller shaft 2 revolves and extends upwardly out of the water-surface floating platform and has transmission cooperation with a power input of the power generation assembly. The impeller assembly is limited downwardly along the axis of the impeller shaft 2 and is capable of floating on working regions of sea together with the water-surface floating platform. When used, the impeller assembly is located below the sea surface, and the blade components are driven by ocean current, by which the impeller shaft is rotated, thus kinetic energy of ocean current could be collected and output.

In the present embodiment, the impeller shaft 2 is a cylindrical truss shaft, and the blade components at least comprise blades 3 arranged uniformly along the circumferential direction of the cylindrical truss shaft. Adopting the structure of the cylindrical truss shaft could avoid huge resistance onto ocean current, which could ensure stability of the device of the present invention. At the same time, the truss structure has a good ability for distributing moments of forces, so that uniform forces could be applied upon the whole shaft, which could ensure the device's lifetime.

In the present embodiment, the blades 3 are arranged for capable of swinging in a sector shape around the vertical axis, which could adopt a conventional hinge structure. Moreover, the blades 3 are limited along the rotary direction of the cylindrical truss shaft and apply resistance upon ocean current. The limit could adopt any conventional mechanical structure, including rigid limit (stopping block) or flexible fibers (a spring for applying pre-tightening force, and so on). The structure of swinging blades limited in the rotary direction makes blades swing freely in an opposite direction, thus preventing resistance, which could ensure smooth rotation of the impeller assembly of the present invention, and reduce resistance in the opposite direction and fully utilize ocean current power.

In the present embodiment, the blade components further comprise blade frames 4 fixed uniformly around the circumferential direction of the cylindrical truss shaft. Said blades 3 could swing in a sector shape around the vertical axis hinge with the blade frames 4. Adopting the frame structure for arranging blades 3 could strengthen installment of blades 3, extend lifetime, and simplify the installment of blades 3.

In the present embodiment, overload discharging elastic elements 5 are disposed on the blade frames 4, the overload discharging elastic elements 5 apply pre-tightening forces onto the blades 3 for limiting the positions of the blades 3 along the rotary direction of the cylindrical truss shaft, and apply resistance on ocean current. Any conventional structure could be used for applying pre-tightening forces, including torsion spring, coil spring, spring strip or compressed spring and so on. Setting discharging pre-tightening force, when kinetic energy of ocean current is too large and exceeds the pre-tightening force, the overload discharging elastic elements 5 are compressed, bended down or stretched, blades will swing toward the rotary direction and current is discharged, which buffers kinetic energy of ocean current and prevents the device of the present invention from damage.

In the present embodiment, the blade frames 4 have a grid structure disposed vertically. Each blade 3 respectively corresponds to each grid of the grid structure. Thus, multiple blades could be disposed in the construction and correspond to the grid structure, which is convenient for installment and detachment, moreover convenient for examination, exchange and maintenance. The cylindrical truss shaft comprises vertical poles 2a distributed uniformly around the circumferential direction and supporting ribs I 2b for fixedly interconnecting the vertical poles 2a. The design has a simple structure, great strength, and could form a larger space for passing current, which further reduces resistance.

The blade frames 4 are fixedly interconnected by supporting ribs II 6, which increases the whole strength of the blade assembly and ensure its performance.

In the present embodiment, the power generation assembly comprises transmission components and power generators 7, as illustrated in figures, the power generator is installed upon the water-surface floating platform via a support 12. The transmission components comprise an annular body 8 coaxially and fixedly connected with the cylindrical truss shaft and a driving gear ring 10 fastened at least along the circumferential direction onto the annular body. A driven gear 11 engaged with the driving gear ring 10 for inputting power into the power generators 7 is disposed at the power input of the power generators 7. The annular body 8 is revolvably disposed on the upper surface of the water-surface floating platform 1. The revolvable cooperation structure could adopt any conventional mode, which has a simple and compact structure, and has a low production cost.

Figure 5:
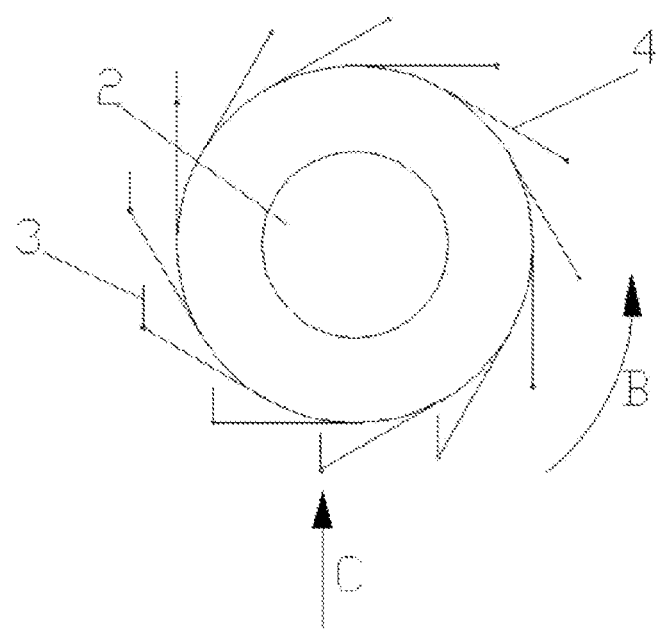
FIG. 5 is a schematic view of the arrangement of the blade frame.
Figure 6:
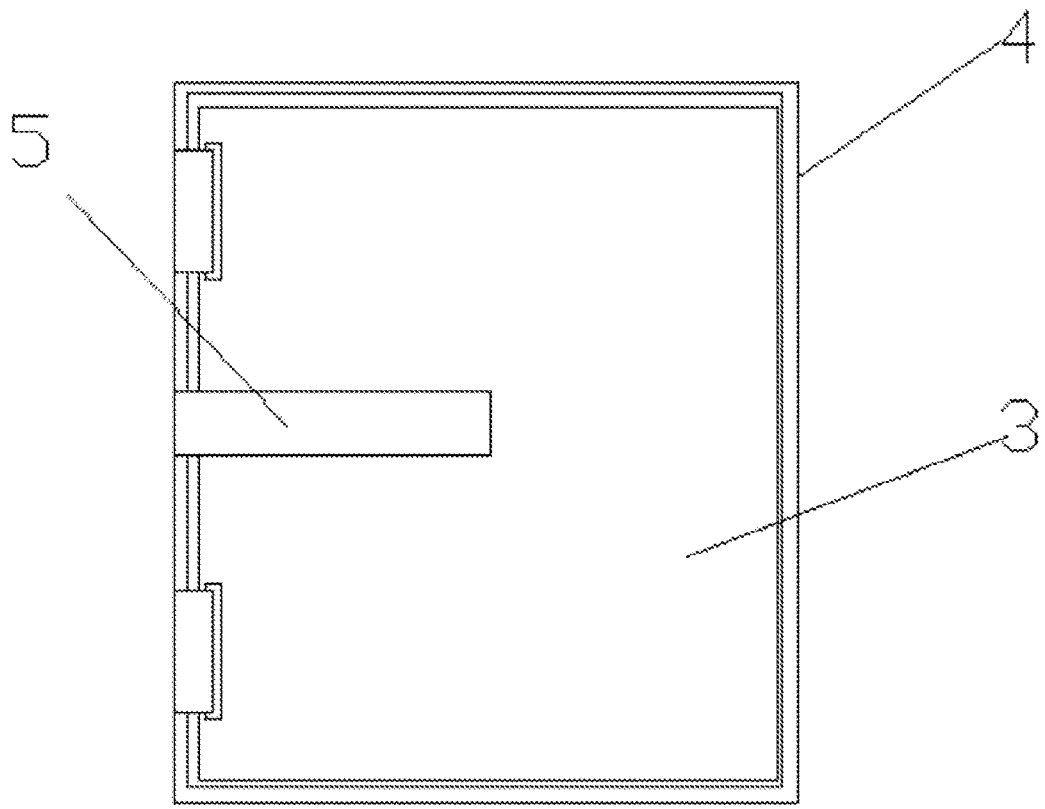
FIG. 6 is a schematic view of the arrangement of the overload discharging elastic element.

In the present embodiment, the plane of the blade frame 4 is along the tangential direction of the cylindrical truss shaft 2. As illustrated in FIG. 5, arrow B indicates the rotation direction, and arrow C indicates the ocean current direction. Blades are open or closed according to ocean current direction and rotation direction, which increases rotation efficiency. The overload discharging elastic elements 5 adopt a spring-strip structure, one end of which is fixed on the blade frame 4 and applies elastic force upon blades 3. The elastic force limits the position of blades 3 in the rotary direction. The spring-strip structure is easy for arrangement and installment, has a lasting elastic force, and has a good lamination with blades.

In the present embodiment, the cylindrical truss shaft 2 is detachable and could be assembled in different length, may adopt any conventional assembling truss structure. A part of the end of the truss shaft could adopt a fixedly soldered structure. The blade frame 4 is connected detachably with the cylindrical truss shaft 2. The length of the truss shaft 2 could be freely prolonged or shortened according to depth of the sea area, which has great applicability.

In the present embodiment, a fixed abutment 9 is disposed on the water-surface floating platform 1; the annular body 8 is revolvably disposed on the fixed abutment 9 and forms a revolute joint with the fixed abutment 9. The revolute joint could adopt any conventional structure. One person skilled in the art should know that according to the above-mentioned description. However, the revolute joint shouldn't be limited by conventional structures. In the present embodiment, the revolute joint has a structure of a thrust bearing; a rolling wheel declined outwardly from up to down or a plane-sliding bearing. The thrust bearing could bear axial forces as well as radial forces, which could be adapted for complex ocean environment. As illustrated in figures, the present invention adopts a structure of a rolling wheel declined outwardly from up to down, which comprises a rolling wheel 19 disposed onto the annular body 8 via a support 20 and an annular guiding track 21 disposed upon the fixed abutment 9 for guiding the rolling wheel 19, then the annular body 8 could be rotated driven by the cylindrical truss shaft. Good ventilation is achieved due to large space between the annular body 8 and the fixed abutment 9, which could avoid rustiness and blocking, ensure smooth operation and could bear a larger radial forces. The annular guiding track 21 is a closed circular ring track, which could be single track, double tracks or multiple tracks for guiding the rolling wheel to rotate and slide circumferentially. When double tracks or multiple tracks are used, an outer track is higher than an inner track for strengthening radial loading capacity of the device. Certainly, thrust bearing structure could be adopted which needs a holding support and so on. Otherwise, a conventional water-lubricating alloy bearing could be adopted, which is better for usage in humid environment.

In the present embodiment, a positioning component is disposed at a lower part of the cylindrical truss shaft, which comprises a positioning shaft 15 fixedly connected with the cylindrical truss shaft, and a shaft sleeve 18 which is coated out of the positioning shaft 15 and revolvably cooperates with thereof. As illustrated in figures, the positioning shaft 15 is fixedly connected with the cylindrical truss shaft via supports 16. The shaft sleeve 18 is used for being connected with an anchor wire 17 used for anchoring thereof. Adopting the structure for dragging and positioning the lower part of the cylindrical truss shaft could avoid the device drifting with ocean current and ensure smooth operation thereof. At the same time, the water-surface floating platform 1 could be dragged and positioned by the anchor wire, which further ensures stability thereof.

In the present embodiment, the water-surface floating platform 1 has a ship-shaped structure or a composite structure (as illustrated in figures) formed by a steel structure 13 and low-density polymeric material 14 which is embedded in the lower part of the steel structure 13. The low-density polymeric material indicates polymeric material with a density lower than water (or sea water), which could be floated on water surface. The power generator comprises multiple power generators 7 which are disposed uniformly around a driving gear ring. Only one generator is illustrated in figures. The multiple power generators 7 have the same installing and engaging structures. Herein, "multiple" means the number of power generators 7 has no upper limit, so long as the diameter of the driving gear ring is large enough. A driven gear is disposed for each power generator 7 and is engaged with the driving gear ring. As illustrated in figures, the driving gear ring 10 and the driven gear 11 are bevel gears.

In the present embodiment, a part of the cylindrical truss shaft 2 revolvably cooperates with the water-surface floating platform 1 is disposed with a shaft sleeve 23. A sliding bearing 22 is disposed for cooperation of the water-surface floating platform 1 and the shaft sleeve 23. Not only a sliding fitting pair but also a pivot are formed during operation, which could ensure stability of the structure, reduce radial forces of the output and be favorable for long-term stable operation.

In the present application, fixed connection could be soldered or detachable according to requirements. Transmission cooperation (connection) could be a mode of keyed connection or fixed connection. Each revolvable cooperation could adopt bearing etc (in view of the operating environment of the present invention, a water-lubricating alloy bearing is preferable).

Finally, the above-mentioned embodiment is just used for illustrating technical solutions of the invention, but not limitation. Although the invention is illustrated in detail with reference to the best embodiment, a person skilled in the art should understand that, modification or equal alteration about the technical solutions of the invention without departing from the purpose and scope of the invention should be included in the scope of claims of the invention.

We claim:

1. A floating-type ocean current combination power generation device comprising:
   a water-surface floating platform;
   an impeller assembly vertically passing through the water-surface floating platform and configured to be driven by ocean current to provide rotary mechanical energy, the impeller assembly being limited downwardly along an axis of the cylindrical truss shaft and capable of floating on working regions of sea together with the water-surface floating platform, the impeller assembly comprising:
   a cylindrical truss shaft vertically extending upwardly out of the water-surface floating platform;
   a plurality of blade frames disposed around the cylindrical truss shaft to form a grid structure, wherein first ends of the plurality of blade frames that are radially proximal to the cylindrical truss shaft are directly connected to the cylindrical truss shaft;
   wherein a plane of each blade frame is along a tangential direction of the cylindrical truss shaft;
   a plurality of frame supporting ribs horizontally disposed along a circumferential direction of the cylindrical truss shaft and configured to connect second ends of the plurality of blade frames that are radially distal to the cylindrical truss shaft; and a plurality of blades hinged to the plurality of blade frames and disposed within grids of the grid structure, a power generation assembly located above the water-surface floating platform and having a transmission cooperation with the impeller assembly for receiving and transforming the rotary mechanical energy from the impeller assembly into electric energy;

a positioning assembly disposed at a lower part of the cylindrical truss shaft and comprising:
  a positioning shaft fixedly connected with the cylindrical truss shaft, and
  a shaft sleeve surrounding the positioning shaft and rotationally cooperating with the positioning shaft, wherein the shaft sleeve is used for being connected with an anchor wire used for anchoring thereof.

2. The floating-type ocean current combination power generation device as said in claim 1, wherein each blade is capable of swinging in a sector shape around a vertical axis.

3. The floating-type ocean current combination power generation device as said in claim 2, wherein overload discharging elastic elements are fastened on the blade frames and apply pre-tightening forces onto the plurality of blades for limiting positions of the plurality of blades along the rotary direction of the cylindrical truss shaft and forming resistance against the ocean current.

4. The floating-type ocean current combination power generation device as said in claim 3, wherein
  each blade frame is disposed parallel to the cylindrical truss shaft;
  the cylindrical truss shaft comprises:
    a plurality of vertical poles distributed uniformly along the circumferential direction of the cylindrical truss shaft, and
    truss supporting ribs for fixedly interconnecting the plurality of vertical poles.

5. The floating-type ocean current combination power generation device as said in claim 4, the overload discharging elastic elements are spring strips, and the pre-tightening forces are elastic forces.

6. The floating-type ocean current combination power generation device as said in claim 5, wherein the cylindrical truss shaft is detachable and can be assembled in different lengths, each blade frame is detachably connected with the cylindrical truss shaft.

7. The floating-type ocean current combination power generation device as said in claim 6, wherein,
  the water-surface floating platform has a composite structure formed by a steel structure and low-density polymeric material which is embedded in a lower part of the steel structure;
  the power generation assembly comprises a plurality of transmission components and a plurality of power generators, the transmission components comprise an annular body coaxially and fixedly connected with the cylindrical truss shaft and a driving gear ring fastened at least along the circumferential direction onto the annular body, the plurality of power generators are disposed uniformly around the driving gear ring, each power generator has a driven gear engaged with the driving gear ring;
  a fixed abutment is disposed on the water-surface floating platform, the annular body is revolvably disposed on the fixed abutment and forms a revolute joint with the fixed abutment; the revolute joint has a structure of a thrust bearing, a rolling wheel declined outwardly from up to down or a plane-sliding bearing;
  a power input of each power generator comprises a driven gear for being engaged with the driving gear ring and inputting power into the plurality of power generators;
  the annular body is rotationally disposed on a upper surface of the water-surface floating platform;
  a part of the cylindrical truss shaft rotationally cooperating with the water-surface floating platform is provided with a shaft sleeve,
  a sliding bearing is disposed for cooperation of the water-surface floating platform and the shaft sleeve.

\* \* \* \* \*